United States Patent [19]

Kay

[11] Patent Number: 4,713,798

[45] Date of Patent: Dec. 15, 1987

[54] METHOD OF AND APPARATUS FOR PROVIDING OBJECT DATA BY MACHINE VISION

[76] Inventor: Leslie Kay, 82 Scarsborough Road, Christchurch, New Zealand

[21] Appl. No.: 678,215

[22] Filed: Dec. 4, 1984

[30] Foreign Application Priority Data

Dec. 9, 1983 [NZ] New Zealand ........................ 206,544
Jun. 5, 1984 [GB] United Kingdom ................. 8414283

[51] Int. Cl.$^4$ ........................... G01S 9/66; G01S 9/68
[52] U.S. Cl. ...................................... 367/96; 367/100; 367/95; 367/7
[58] Field of Search .............................. 367/101–103, 367/96, 7, 8, 115, 105, 87, 128, 95; 342/52

[56] References Cited

U.S. PATENT DOCUMENTS

| 4,105,990 | 8/1978 | Rines et al. ............................ 367/96 |
| 4,310,903 | 1/1982 | Kay ....................................... 367/102 |
| 4,423,494 | 12/1983 | Groves et al. ........................ 367/103 |
| 4,447,896 | 5/1984 | Rines ..................................... 367/96 |
| 4,576,286 | 3/1986 | Buckley et al. ....................... 367/96 |

FOREIGN PATENT DOCUMENTS

| 917197 | 1/1963 | United Kingdom . |
| 1088337 | 10/1967 | United Kingdom . |
| 1211933 | 11/1970 | United Kingdom . |
| 1393794 | 5/1975 | United Kingdom . |
| 1439055 | 6/1976 | United Kingdom . |
| 1487360 | 9/1977 | United Kingdom . |
| 2053614 | 2/1981 | United Kingdom . |
| 2091421 | 7/1982 | United Kingdom . |

OTHER PUBLICATIONS

Kruger et al., A Technical and Economic Assessment of Computer Vision for Industrial Inspection and Robotic Assembly, 1981.

*Primary Examiner*—Thomas H. Tarcza
*Assistant Examiner*—Daniel T. Pihulic
*Attorney, Agent, or Firm*—Spencer & Frank

[57] ABSTRACT

A method of and apparatus for carrying out machine vision of an object for obtaining object data therefrom in which the object is illuminated by frequency swept ultrasonic stress wave energy from a transmitting and receiving transducer array, or by light energy from a source, reflected signals are received respectively by the array and an optical-electronic camera, respective images in terms of the data contained in these received signals are fed to a processor in which the data is analysed to make use of the best data derived from both sources of illumination and the resulting data compared with reference data to provide stimuli controlling a reject device and/or positional adjustment devices directing the array and/or the camera.

22 Claims, 4 Drawing Figures

METHOD OF AND APPARATUS FOR PROVIDING OBJECT DATA BY MACHINE VISION

BACKGROUND OF THE INVENTION

This invention relates to a method of and apparatus for providing data relating to an object (herein called object data) by machine vision (as distinct from human vision).

It is known to acquire object data by subjecting the object to illumination (in a broad sense of the term) from an energy source and to produce an image as a result of reflection or interception of the energy, which image can be subject to analysis by machine means (as distinct from human visual perception followed by mental comprehension).

However, such machine vision methods and apparatus, although intrinsically immune to inaccuracy from effects analogous to human fatigue when practiced repeatedly, for example as part of a manufacturing, inspection, investigatory or other field of activity, suffer from certain limitations.

In particular the form of the energy source may preclude or make difficult and expensive detection or determination of certain forms of object data, e.g. the distance of the object from an observation station may not readily be determined by means producing an image of an object illuminated by a light source.

Further, an image produced by illumination of a plurality of objects (like or unlike) by a light source may present difficulty to a machine vision analysing means in selecting a particular one of the objects as the source for derivation of the object data.

The object of the present invention is to retain the advantages of machine vision methods and apparatus while avoiding or reducing limitations such as those mentioned by way of example above.

SUMMARY OF THE INVENTION

According to one aspect of the invention a method of carrying out machine vision of an object for obtaining object data therefrom comprises illuminating the object by at least two sources of energy of different kinds, producing respective images due to such illumination of the object, analysing these images by machine means appropriate thereto and selecting object data parameters from one of the images which are absent from, deficient in, or require confirmation in, the other or others of the images to provide a combination of object data which is more comprehensive or reliable than that obtainable from one of the images alone.

The term "image" used herein is to be deemed to include a machine readable representation of the object viewed from any direction or its profile or outline and to include a plurality of machine readable signals whether present serially in time or in spatial juxtaposition or separation and collectively representing the position or attitude of the object or one or more dimensions thereof or the configuration or area of the object viewed from any direction.

Also, according to the invention, there is provided apparatus for effecting machine vision of an object comprising:

(a) a plurality of sources of illumination of different kinds providing illumination of the object, (b) respective image forming means for viewing said object and forming images of a character appropriate to the kind of illumination, (c) respective means for analysing the data presented by the images.

As regards both the method and the apparatus of the invention, the sources of illumination may comprise a source of electro-magnetic wave energy and a source of stress wave energy. Possibly more than one such source of each kind may be provided should the particular application of the invention make this desirable.

The source of electro-magnetic wave energy may be natural light or a specific man-made source which radiates light energy. While it would be within the scope of the invention for the source of electro-magnetic wave energy to be outside the visible spectrum, for example infra red or ultra violet, in most cases the source of energy would be one radiating light having a wave length within the visible range.

So far as the source of stress wave energy is concerned, this may comprise a transmitting means providing a beam. The beam may be convergent to a focus or a focal region spaced longitudinally along an axis extending from the transmitting means into the field of view. The frequency is preferably in the ultrasonic range.

The image forming means may include receiving means for receiving at least part of the energy (herein called the received signal) reflected from the object when in the field of view and effectively forming a (first) image in respect of illumination of the object by the transmitted (stress wave) signal, and also include an electronic optical camera means to form a (second) image in respect of illumination of the object by the light source.

Further, action performing means responsive to the data derived from the analysing means may be provided for acting on or in relation to the object in a mode determined by the character of the object data from either or both of said images.

The term "character" as used herein is intended to include presence or absence of object data as well as qualitative and quantitative characteristcs of such data.

It is contemplated that the apparatus will have a number of diverse applications in different fields of activity. It may, for example, be applied to sense whether an object, or an object having predetermined characteristics, for example shape, texture or dimensions, is present in a field of view and thereafter control or determine the mode of action performing means for performing some action in relation to the object, e.g. subjecting it to a particular treatment, or controlling operation of the sources of illumination.

The apparatus may include means for imposing predetermined characteristics upon the signals giving rise to one or both of the images in respect of at least one of the parameters pertaining thereto and selected to establish that the image produced by received signal concerned shall contain the rquired object data.

The means for imposing predetermined characteristics upon the signals giving rise to the images may differ widely in accordance with the particular data concerning the object which the received signal is required to carry. Thus, if one of the characteristics which the first image is required to carry is the range or distance of the object or some part thereof from a predetermined point, e.g. the station at which the transmitting means is situated, then the stress wave energy would be used to provide this object data, and the means for imposing the predetermined characteristic may comprise a means for frequency modulating the stress wave transmitted signal in a mode such that the frequency difference between the transmitted signal and the received signal, due to the elapse of transit time between initial radiation of the signal and receipt of the reflection, is representative of the range or distance. In such a case the means for imposing the predetermined characteristic would appropriately impose a frequency sweep on the transmitted signal which may be linear or non-linear but which is preferably of saw-tooth form.

If the required object data were required to include information concerning the lateral or angular position of the object, a part thereof or the angular width subtended by the object at a predetermined point, e.g. that at which the transmitting means is situated, and the stress wave energy were used to provide this object data (at least as a first approximation) then the means for imposing a predetermined characteristic may comprise means to establish that the transmitted signal is radiated by way of a beam (conveniently represented as a polar diagram with the radius vector centered on a predetermined point) having a maximum value in the central region of said beam and a minimum value at each of two opposite boundaries thereof in a reference plane, and means for scanning the beam angularly in said plane through the field of view between boundaries thereof. The reference plane may be an azimuthal plane or an elevational plane, or both, or some intermediate plane.

If necessary, or desirable, means may be provided for imposing pedetermined characteristics upon the signals (e.g. those due to illumination by electro-magnetic wave energy) giving rise to the second image in respect of at least one of the parameters pertaining thereto to establish that the second image shall contain the required object data. For example, the object may be selectively illuminated when it is required to pick out a particular feature, the characteristics of which require to be determined, or the wave length of the illuminating rays may be selected to provide reflections of a particular character from the object.

Any of these forms of imposing predetermined characteristics may be combined with each other, as appropriate, to ensure that object data of the kind required to be determined will be present in the images.

In a preferred form of apparatus:
(a) one of the sources of illumination comprises transmitting means is adapted for transmitting frequency modulated stress wave energy and includes an oscillator, an array of transmitting transducer elements providing a beam, and connecting means connecting said oscillator with said transducer means, and scanning means for moving the beam angularly from a datum position in the field of view to effect scanning of the field of view to illuminate, successively, respective sectors of the field of view over respective scan periods, said scanning means including
  (i) time delay means in said connecting means imposing increments of time delay in radiation of said wave energy from said transducer elements systematically along said array in a manner to determine the angular position of said beam,
  (ii) electronic means for rapidly cyclically varying the magnitude of said increments of time delay to vary the angular position of said beam and establish scanning of the field of view, (b) the image forming means comprises receiving means including means providing a correspondingly frequency modulated locally generated signal, and modulator means connected operatively in said receiving means and with said means providing said locally generated frequency modulated signal to produce an object data signal at a frequency equal to the frequency difference between the received signal and the locally generated signal, the mode of frequency modulation of the latter being such that said frequency difference is representative of the range of the object, (c) the means for analysing the (first) image may provide for segregation of the object data signals due respectively to objects of different ranges, and due respectively to objects in different ones of said successive sectors, (d) the action performing means comprises directing means responsive to the object data to direct the camera means or the transmitting means towards any object producing objecta data of a predetermined character.

The time delay means may also provide that the increments of time delay in radiation of said wave energy from said transducer elements along said array determine axial position of a focus or focal region of the beam. Convergence may be presented in a single plane or in orthogonal planes containing said axis.

The means for analysing the (first) image produced by the stress wave energy receiving means may include
  (i) frequency responsive means for effecting spectral analysis of the difference frequency signals and providing output signals pertaining to objects in respective range bands,
  (ii) means for collecting said output signals over each of said scan periods pertaining to respective sectors of the field of scan,
  (iii) time compensating means operative in combination with the two last said means to compensate for transit time of the transmitted and received signals in the field of view and establish the correct correlation between the collected output signals and said scan periods.

BRIEF DESCRIPTION OF THE DRAWINGS

The invention will now be described, by way of example, with reference to the accompanying drawings wherein.

DESCRIPTION OF THE PREFERRED EMBODIMENTS

Figure 1:
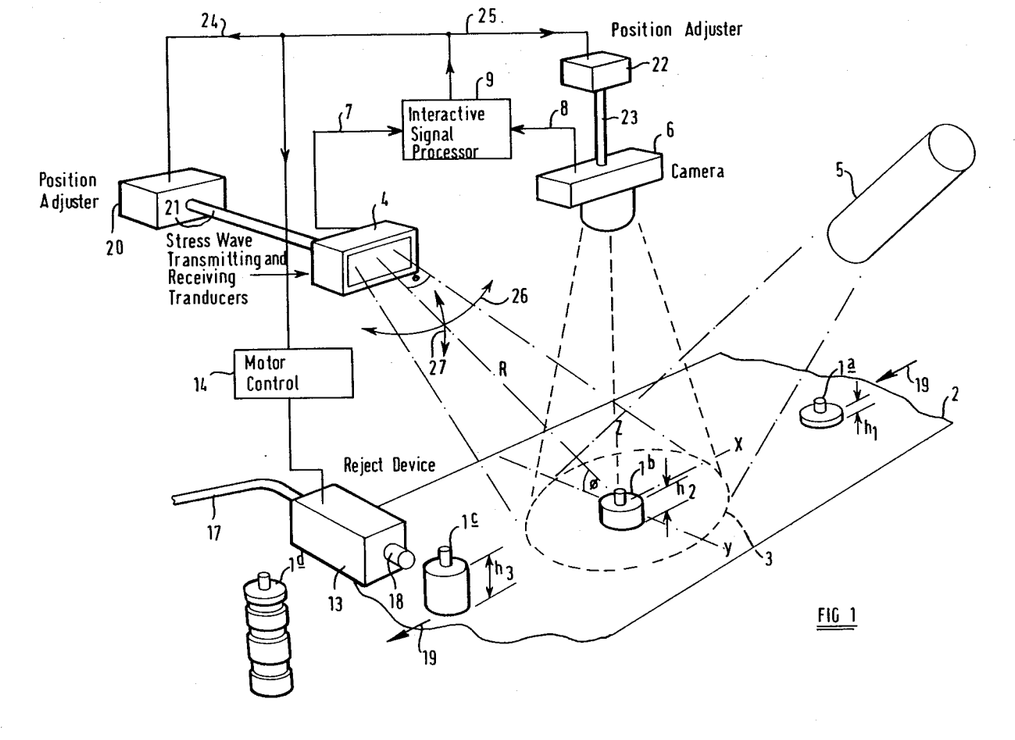
FIG. 1 illustrates an embodiment of the invention showing the physical disposition of certain of the main parts.

In FIG. 1, objects such as 1a, 1b, 1c are moved by conveyor means 2 along a feed path, as indicated by arrows 19, through a field of view 3 at which object data is required to be determined in respect of each of the objects. The object data may be required for the purpose of determining whether each object conforms to certain characteristics. These characteristics may be contained in object reference data, acting as a reference for comparison purposes, stored in a memory (hereinafter described). If the objects examined do not provide data conforming to the stored data they may be thereafter acted upon by action performing means, for example reject means, to displace the objects from the conveying path into a reject bin or reject path (not shown).

It may not be possible reliably to determine whether the objects conform to the stored data by utilization of one kind of source of wave energy for illuminating the objects because a single source may not enable an image to be formed in which the required item of object data is present, or in which the required item of object data is satisfactorily presented to enable a proper comparison with the stored data to be made.

Accordingly, a plurality of kinds of sources of illumination, for example two in the present case, are utilized and a corresponding number of image forming means each receptive to the wave energy of a respective source form images from which the required items of object data can be derived when these images are considered collectively.

Thus, one such source of wave energy comprises an array of transducers 4 energised electrically and furnishing ultrasonic stress wave energy. This array illuminates an object 1b in the field of view 3 and the same array or part thereof is used to constitute the receiving means for forming a first image.

A second source of illumination comprises one providing light rays. In some cases this source may be constituted by natural light in the vicinity of the apparatus but preferably a specific light source 5 providing light in the visible spectrum is provided to illuminate the field of view 3 thereby substantially eliminating fluctuations in light intensity which might occur were natural light relied upon.

To receive reflections of light from the object in the field of view and form a second image, a camera means 6 is provided having an optical system for focusing an optical image of the object onto a means for converting the optical image into an electrical image in which signal generating elements are in juxtaposed or spaced relation to each other and from which a digital signal can be derived and stored by appropriate scanning means. The electrical image may be formed by a charge coupled device, or an array of photo diode elements and charge injection devices as in the known type of Retican camera.

Object data may be fed along channels 7 and 8 to a processor 9 in which means are provided for identifying data pertaining to selected object characteristics and obtained respectively from the two sources of object data, e.g. data relating to position, range, and, where appropriate, lateral dimensions of the object. The processor 9 may include means for comparing corresponding data items from the two sources to determine which should be passed for continued use, and which should be rejected, e.g. on grounds of quality. Further, the processor 9 may include means for forming a combined image form which object data can be extracted for various purposes. One such purpose may be to control the action performing means. The action performing means may include a reject means 13 controlled by a motor control circuit 14 fed with signals along conductor 15 from the processor 9 and supplying control signals along line 16 to the reject means 13. The latter may be connected to an air line 17 and supply an ejecting air blast from a nozzle 18 to displace reject objects laterally of the feed path indicated by arrows 19. Further, the action performing means may include means for controlling the direction or orientation of the transducer array 4 or the camera means 6 as hereinafter mentioned. Thus the array 4 may be positionally adjusted by a means 20 coupled mechanically, as indicated at 21, to the array 4, and the camera may be positionally adjusted by a means 22 coupled, as indicated at 23, to the camera, control being effected by signals passing along lines 24,25 respectively from the processor 9.

It is not necessary that each of the objects 1a, 1b, 1c shall be closely similar to each other. There may be considerable divergence in the form and dimensions of the objects; as represented, for example, objects 1a, 1b, 1c may have differing heights $h_1$, $h_2$, $h_3$ and object 1d may have an even greater height and circumferentially extending groove formations since the ability of the apparatus embodying the different sources of illumination and plurality of image forming means to extract data from a wide variety of objects and compare the result with stored data is considerable.

Figure 2:
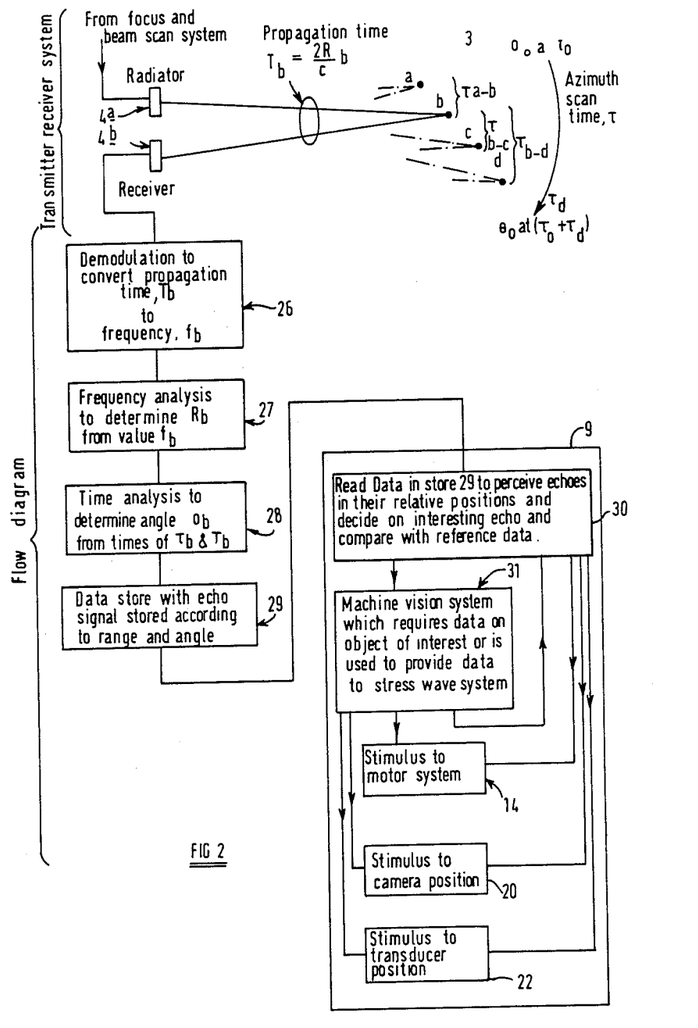
FIG. 2 illustrates diagrammatically one embodiment of the means for illuminating the object with stress wave energy and a flow diagram for deriving and handling the object data thus obtained.

In FIG. 2 certain items depict in a block schematic manner integers of the apparatus, while others represent operation stages and are connected effectively to present a flow diagram. Generally, the apparatus comprises a transmitting means 10 for transmitting ultrasonic frequency swept stress wave energy to the field of view 11 which is now illustrated as concurrently containing objects a, b, c, d illuminated by the stress wave energy and from which reflections of such energy take place for reception at a receiver 12.

Figure 4:
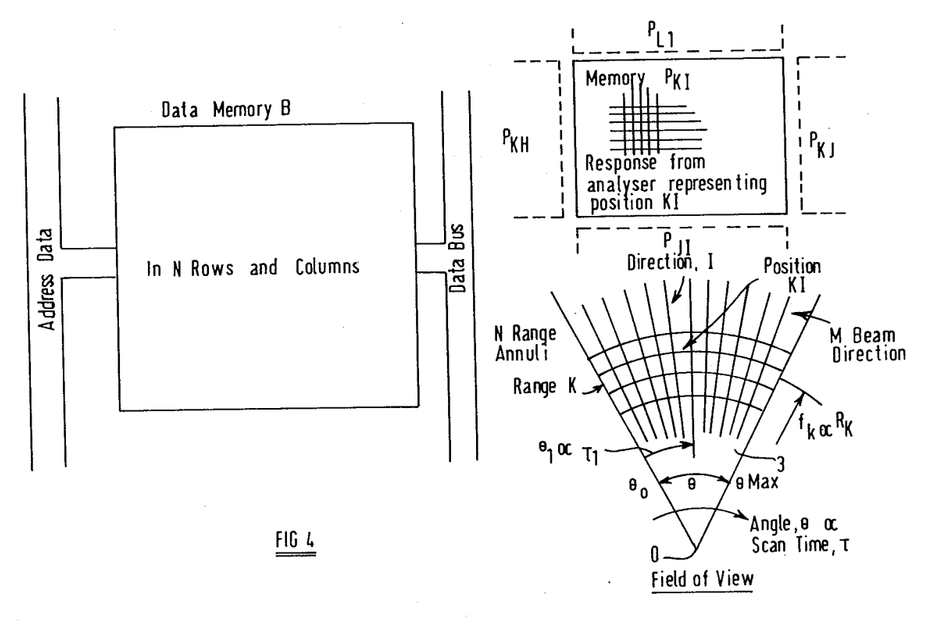
FIG. 4 is a diagrammatic illustration showing the form of data memory which may be utilised by units shown in FIG. 3.

The form of transmitting means and receiving means may be as disclosed in the specification of my granted U.S. Pat. No. 4,310,903. In general terms this transmitting and receiving means comprised a transmitting means for transmitting stress wave energy frequency swept linearly between a saw-tooth mode and radiated to a sector-shaped field of view, as now also depicted in FIG. 4, in the form of a narrow beam by the strip array 4a of transducer element fed with the transmitted signal from tapping points on an analogue delay line. The delays imposed were varied differentially as between respective transducer elements and cyclically to produce scanning of the beam from one boundary to the other of the field of view. The receiving means for receiving signals reflected from objects in the field of view included a transducer 4b, a modulator fed with both the received incoming signals and a local signal frequency swept in correspondence with the transmitted signal, and providing an output containing difference frequency signals representing the ranges of the objects from the origin of the field of view. The receiver further included channels containing band pass filters for passing respective difference frequency signal bands from objects situated in respective range annuli, and the channels also contained respective time delay units to compensate for differing signal transit times pertaining to respective annuli so that the outputs from the channels could be scanned to provide data as to the range and angular position in the field of view occupied by the object giving rise to each received signal.

In an application to which the present invention relates where, as one illuminating source, stress wave energy is radiated and received as above described into the field of view containing the object for controlling the action by a robot, the transmitted signal may typically be swept between 150 KHz–300 KHz in a descending saw-tooth mode radiated in the form of a relatively angularly narrow beam typically with a focal region having a width of 6 mm. and be scanned through an angle $\theta$, for example in azimuth, over a field of view extending from an angle $\theta_0$ to $\theta_{max}$ (FIG. 4) which may be approximately 60°. These values are intended to be illustrative rather than limiting. The scanning means may be duplicated to provide for scanning both in elevation and azimuth as indicated by arrows 26,27 (FIG. 1).

Also, as disclosed in my prior patent above mentioned, the embodiment of apparatus of the present invention now described also provides for range determination, that is whether an object is situated in any one of a number of range annuli concentric with the origin or centre 0 of the field of view. The apparatus thus provides for determination of the frequency difference between the transmitted signal (or a locally generated signal derived from the transmitted signal) and the received signal. The inner and outer radial boundaries of each range annulus correspond to a frequency pass band presented by a respective one of a series of pass band filter elements through which a difference frequency signal is passed and the output of each filter element carries signals pertaining to only one range annulus.

The time taken in transit for a wave to travel outward and return from, say, an object b at a range $R_b$ is given by the expression $T_b=(2R_b)/C$
where
C is the velocity of propagation of the wave energy in the medium of the field of view.

Consequently in each beam position signals are received at a time t given by the equation $t=t_o+T+\tau$ where
- $t_o$ represents the time at which the beam occupied its starting position from one extremity of the field of view (e.g. $\theta_0$),
- T is the transit time of a wave to the object and back,
- $\tau$ is the time taken for the beam to scan angularly from its starting position to the particular sector under consideration (i.e. in which the beam is situated for irradiation of the object).

For the object b, the transit time $T_b$ will be known from the frequency analysis of the difference frequency signal. Since both $T_b$ and $t_o$ are known, therefore $\tau_b$ can be determined at any given instant. $t_b$ is the instant at which the reflected signal is received from object b, and $T_b$ is the instant at which the beam is positioned in the angular sector for irradiating the object b.

Thus, in the system illustrated in FIG. 2, box 26 represents the conversion of transit time $T_b$ to a difference frequency $f_b$ (given by subtraction of the frequency of the transmitted or locally generated signal from the frequency of the received signal), box 27 represents frequency analysis (e.g. by a bank of band pass filters, one for each receiver channel) to provide determination and the value of the pass band $f_b$ and hence the range band in which the object range $R_b$ lies. Also box No. 27 will, of course, inherently contain information as to the magnitude of the time $T_b$.

In box No. 28 the angular position of the sector ($\theta_b$) in which signals are transmitted to irradiate b is determined when the quantity $\tau_b$ has been calculated. Collectively the range band data and the angular position data constitute the first image of the object.

Box No. 29 represents the operation of storing this object data. This is further illustrated diagrammatically in FIGS. 3 and 4. The store B1 (FIG. 3) is loaded with signals derived from the received signals and comprises a memory system (FIG. 4) having addresses defined notionally by the intersection of N rows responding to respective range annulii and M columns corresponding to respective sectors in the field of scan.

Figure 3:
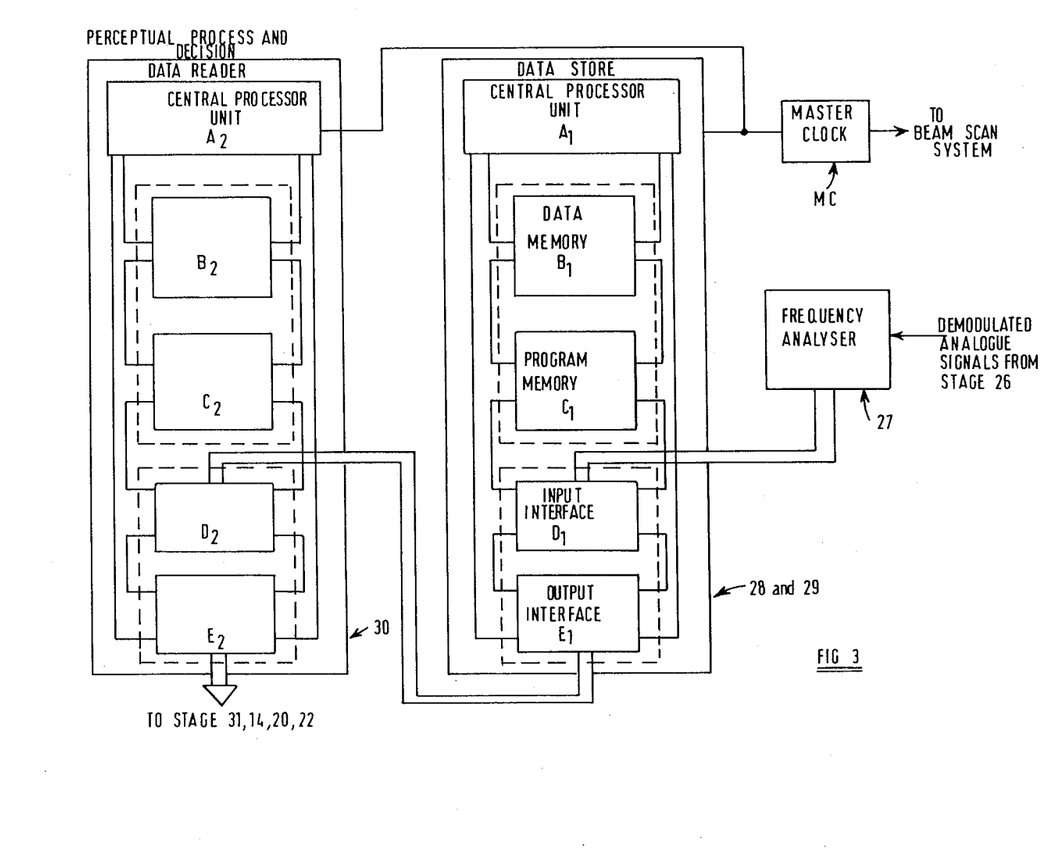
FIG. 3 is a fragmentary block schematic circuit diagram illustrating in more detail certain elements of apparatus shown in FIG. 2.

Stages 3 and 4 may be performed by a central processor unit as illustrated in FIG. 3 in which the central processor unit proper (microprocessor) is designated A1, associated data and programme memories B1, C1 and input and output interfaces D1, E1. Input data is fed from the frequency analyser 28 (FIG. 3) corresponding to box No. 28 of FIG. 2. Operation of the central processor unit is controlled by a master clock Mc which forms a unit of the transmitter beam scanning system already mentioned.

Box 9 (FIG. 2) indicates in more detail the operations carried out by the processor 9.

In stage 30 the object data stored in stage 29 is read, to perceive the echo signals in their relative positions and select the echo of interest, and to compare with stored reference data. In stage 31 stimuli are developed to provide for rejection (stage 14) of an object (failure to conform to stored reference data), or effect positional adjustment by camera (stage 20) and transducer array (stage 22).

As indicated in still more detail in FIG. 3, the data is processed under the control of a master clock MC, also controlling the beam scan of array 4. The data stored (by stage 29) is read and compared with further stored reference data for the purpose of determining whether the ascertained object data conforms or does not conform to a standard or reference represented by this further stored data. The action to be performed on or in relation to the object may be determined as a result of this comparison. Reading and comparison is performed in stage No. 30. If the result of the comparison is sufficiently well defined for an action on the object, this may be performed by operation of a motor system (stage No. 14), e.g. to reject an object. For this purpose a further central processor unit may be provided as shown in FIG. 3 comprising central processor unit proper A2 (a microprocessor) and further memories B2 and C2 in which the former may be used to contain the further or reference data and the latter to control the programme of reading and generating output signals to be supplied to the motor system 14.

If, on the other hand, the object data as stored in B1 is insufficient reliably to identify an object or determine the action required, this data or parts of it such as the range of the object $R_b$ and the angle $\theta_b$ may be used to control the image processing of the camera system (commonly known in Robotic systems as the machine or artificial vision system). For example, the position of the object in the image plane of the camera system is calculated in stage No. 31 from the range $R_b$ and angle $\theta_b$ and the known position of the stress wave transducers. The camera is used to concentrate on the region containing the object image and may ignore the remainder of the field of view. The image forming means for producing a second image, namely the camera, is able to determine those characteristics of the object which the camera system makes possible and which are absent from, or deficient in, the stress wave (first) image. Thus, the second image may contain more accurate data as to the position of the object in the image plane in terms of cartesian coordinates.

The process of determining the x, y coordinates on the camera system image of an object and coordinates $R_b$ and $\theta_b$ in the stress wave system can follow straight forward well known methods. The process of comparing the object data from the first and second images with stored object data can also be carried out by known computer imaging and correlation methods. The process of improving the quality of the object data may be that of deleting the stored object character derived from the first image and which is of lesser quality and inserting in store the better quality data from the camera system. For example, a more accurate position of the object in the x, y coordinates of the second image may be converted to a more accurate set of values for $\theta_b$ of the first image.

This higher quality object data is then used in effect to store a combined image and to determine the action to be performed by operation of an action performing means.

In this way it will be evident that object data collected by camera system is used, for example, either to apply data not collected, or collected imperfectly by stress wave means, to improve the overall quality of the object data produced and stored. Specifically the camera system may supply reliable dimensional data, e.g. between opposite boundaries of any part of the profile of the object not satisfactorily available from the stress wave (first) image whereas the latter may contain range data absent from the camera system (second) image.

In other cases initial determination of data may be from the second image, and absences or deficiencies would then be supplemented or corrected by data derived from the first image.

The apparatus as a whole is suitable for various purposes.

Thus it may be applied to the monitoring of workpieces during manufacturing operations, in the sense of determining whether these are present at a work station at the required times. It may also determine whether workpieces have the required shape or dimensions. As indicated above, such dimensions may be lateral dimensions which could be initially measured angularly by scanning of the transmitter 10 to provide for signal reflection in each of two or more successively adjacent sectors of the field of view to measure an angular width. The camera system may be used to increase the accuracy of this measurement and also determine the position of the workpiece measured with respect to some identifiable datum point on the workpiece relatively to a datum point in the field of view. The stress wave system may be used to determine range of the object.

Alternatively, or in addition, reflections may be received of the stress wave energy from parts of the object at different ranges and a correctly dimensioned object would, therefore, produce the required range signals loaded to appropriate addresses. Failure to establish coincidence between these signals and those stored for comparison purposes at corresponding addresses would be utilised to energise a reject device either pneumatically energised, as indicated above, or a motor system of, say, a robot arm, to eject the fault workpiece mechanically.

When more than one object is in the work station, as for example when one object has to be picked from a bin containing many objects, the combination of the stress wave system and the camera system enables recognition and position of the uppermost object to be effected.

What is claimed is:

1. A method for carrying out machine vision of an object in order to obtain data representative of selected parameters pertaining to the object, said method comprising: illuminating the object with at least two different kinds of energy supplied by two different sources so that each different kind of energy is reflected from the object; deriving, from each kind of energy reflected from the object, respective signals each containing data representative of at least one of the selected parameters, wherein, with respect to the at least one of the selected parameters, the signals derived from one kind of energy contain more accurate data than do the signals derived from the other kind of energy; processing the derived signals to obtain, from each kind of energy reflected from the object, a respective initial set of parameter-representative data elements, with at least one given data element representative of at least a given one of the selected parameters being absent from, deficient in, or requiring confirmation in one of the initial sets; selecting the at least one given data element from the other initial set in order to provide a combined set of data elements which constitute more accurate representations of the selected parameters than do either initial set; and applying the combined set of data elements to control performance of a given operation with respect to the object.

2. A method according to claim 1 wherein said step of processing comprises deriving a respective image of the object from the signals derived from each kind of energy, and analyzing the images by machine means to produce the initial sets of data parameters.

3. A method according to claim 1 wherein: said step of deriving is carried out by means of two energy receiving means each responsive to a respective one of the two kinds of energy; the given one of the selected parameters identifies the position of the object; and said step of applying comprises using the parameter-representative data element representative of the given one of the selected parameters form one initial set for directing toward the object the energy receiving means responsive to the kind of energy from which signals are processed to produce the other initial set.

4. A method according to claim 3 wherein the energy from which the one initial set is obtained is stress wave energy, and the energy from which the other initial set is obtained is light energy.

5. A method according to claim 4 wherein the energy receiving means directed toward the object in said step of applying produces a signal containing a data element representative of a selected dimension of the object.

6. A method according to claim 4 wherein the energy receiving means directed toward the object in said step of applying produces a signal containing a data element which is more accurately representative of the position of the object.

7. A method according to claim 4 wherein the light energy has wave lengths within the visible range.

8. A method according to claim 4 wherein the stress wave energy has an ultrasonic frequency.

9. Apparatus for effecting machine vision of an object comprising:
(a) a plurality of sources of illumination of different kinds providing illumination of the object,
(b) a plurality of receiving means appropriate to said sources respectively for receiving energy reflected from the object and providing respective received signals;

(c) means for processing said received signals to provide respective sets of data elements representing respective parameters pertaining to the object, and means for sensing the data elements of each set and determining and selecting, with respect to at least one parameter, the data element of the one of the two sets which constitutes a more accurate representation of that parameter;

(d) action performing means for acting in a manner determined by at least the selected data element of said one set and by at least one data element of the other one of the two sets.

10. Apparatus according to claim 9 wherein the sources of illumination comprise a source of stress wave energy, and a source of light energy and wherein the means for processing the received signals derived from the stress wave energy provides a positional data parameter concerning the object and wherein there is provided means for directing the receiving means for the light energy responsive to said positional data parameter to direct said receiving means towards the object.

11. Apparatus according to claim 10 wherein the source of stress wave energy comprises a transmitting means providing a beam which is convergent to a focus or focal region spaced longitudinally along an axis extending from the transmitting means into the field of view.

12. Apparatus according to claim 10 wherein the stress wave energy has an ultrasonic frequency.

13. Apparatus according to claim 10 wherein the source of electro-magnetic wave energy radiates light energy.

14. Apparatus according to claim 13 wherein the light energy has wave lengths within the visible range.

15. Apparatus according to claim 9 wherein said receiving means effectively form a (first) image in respect of illumination of the object by the transmitted (stress wave) signal, and also includes an electronic optical camera means to form a (second) image in respect of illumination of the object by the light source.

16. Apparatus according to claim 15 wherein there is further provided action performing means for acting on or in relation to the object in a mode determined by the character of the object data from either or both of said images.

17. Apparatus according to claim 15 including means for imposing predetermined characteristics upon at least part of the signals giving rise to one or both of the images in respect of at least one of the parameters pertaining thereto and selected to establish that the image produced by the received signal concerned shall contain the required object data.

18. Apparatus according to claim 17 wherein the means for imposing the predetermined characteristic comprises means for frequency modulating the stress wave transmitted signal in a mode such that the frequency difference between the transmitted signal and the received signal, due to the elapse of transit time between initial radiation of the signal and receipt of the reflection, is representative of the range or distance.

19. Apparatus according to claim 17 wherein the means for imposing a predetermined characteristic comprises means to establish that the transmitted signal is radiated by way of a beam having a maximum value in the central region of said beam and a minimum value at each of two opposite boundaries thereof in a reference plane, and means for scanning the beam angularly in said plane through the field of view between boundaries thereof.

20. Apparatus according to claim 15 wherein (a) one of the sources of illumination comprises a transmitting means adapted for transmitting frequency modulated stress wave energy and includes an oscillator, an array of transmitting transducer elements providing a beam, connecting means connecting said oscillator with said transducer means, and scanning means for moving the beam angularly from a datum position in the field of view to effect scanning of the field of view to illuminate, successively, respective sectors of the field of view over respective scan periods, said scanning means including (i) time delay means in said connecting means imposing increments of time delay in radiation of said wave energy from said transducer elements systematically along said array in a manner to determine the angular position of said beam, (ii) electronic means for rapidly cyclically varying the magnitude of said increments of time delay to vary the angular position of said beam and establish scanning of the field of view, (b) the image forming means comprises receiving means including means providing a correspondingly frequency modulated locally generated signal, and modulator means connected operatively in said receiving means and with said means providing said locally generated frequency modulated signal to produce an object data signal at a frequency equal to the frequency difference between the received signal and the locally generated signal, the mode of frequency modulation of the latter being such that said frequency difference is representative of the range of the object, (c) the means for analysing the (first) image provide for segregation of the object data signals due respectively to objects of different ranges, and due respectively to objects in different ones of said successive sectors, (d) there is further provided action performing means operative in response to object data derived from at least one of said images and comprising directing means responsive to the object data to direct the camera means or the transmitting means towards any object producing object data of a predetermined character.

21. Apparatus according to claim 20 wherein the time delay means imposes increments of time delay in radiation of said wave energy from said transducer elements systematically along said array to determine axial position of a focus or focal region of the beam.

22. Apparatus acording to claim 20 wherein the means for analysing the (first) image produced by the stress wave energy receiving means includes (i) frequency responsive means for effecting spectral analysis of the difference frequency signals and providing output signals pertaining to objects in respective range bands, (ii) means for collecting said output signals over each of said scan periods pertaining to respective sectors of the field of scan, (iii) time compensating means operative in combination with the two last said means to compensate for transit time of the transmitted and received signals in the field of view and establish the correct correlation between the collected output signals and said scan periods.

* * * * *